(12) United States Patent
Ghatak

(10) Patent No.: US 11,989,234 B1
(45) Date of Patent: May 21, 2024

(54) RULE ENGINE IMPLEMENTING A RULE GRAPH FOR RECORD MATCHING

(71) Applicant: Amazon Technologies, Inc., Seattle, WA (US)

(72) Inventor: Kausik Ghatak, Kolkata (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,680

(22) Filed: Jun. 29, 2022

(51) Int. Cl.
*G06F 16/901* (2019.01)
*G06F 16/22* (2019.01)
*G06F 16/26* (2019.01)

(52) U.S. Cl.
CPC ...... *G06F 16/9024* (2019.01); *G06F 16/2282* (2019.01); *G06F 16/26* (2019.01)

(58) Field of Classification Search
CPC ... G06F 16/9024; G06F 16/2282; G06F 16/26
See application file for complete search history.

(56) References Cited

U.S. PATENT DOCUMENTS

| 10,013,439 B2 * | 7/2018 | Gruenheid | G06F 16/214 |
| 2009/0106149 A1 * | 4/2009 | Bennett | G06Q 20/4016 705/42 |
| 2012/0059784 A1 * | 3/2012 | Gould | G06N 5/025 706/47 |
| 2013/0085977 A1 * | 4/2013 | Junker | G06N 5/025 706/47 |
| 2013/0268258 A1 * | 10/2013 | Patrudu | G06F 40/40 704/9 |
| 2013/0346294 A1 * | 12/2013 | Faith | G06Q 20/4016 705/39 |
| 2014/0297664 A1 * | 10/2014 | Stevens | G06F 16/24554 707/754 |
| 2016/0071016 A1 * | 3/2016 | Goyal | G06N 5/045 706/47 |
| 2018/0342007 A1 * | 11/2018 | Brannigan | G06Q 30/0643 |
| 2018/0342323 A1 * | 11/2018 | Shankar | G16H 10/60 |
| 2021/0081924 A1 * | 3/2021 | Jhas | G06Q 20/386 |

* cited by examiner

*Primary Examiner* — Miranda Le
(74) *Attorney, Agent, or Firm* — Kilpatrick Townsend & Stockton LLP

(57) ABSTRACT

An approach for rule engine, filtering, and rule management is described herein. A computing device can access a rule graph that represents rule sets and includes nodes connected by edges. The computing device can receive record data associated with a record and determine at least one of the rule sets that matches the record by at least traversing the rule graph using the record data. The computing device can generate rule information based on the at least one rule set and associate the rule information with the record.

20 Claims, 10 Drawing Sheets

US 11,989,234 B1

RULE ENGINE IMPLEMENTING A RULE GRAPH FOR RECORD MATCHING

BACKGROUND

Computing systems may reference a set of rules when evaluating input data to generate an output. These rules may be stored in a table or other tabular format. For example, a classification engine of a server computer may access a rule table to classify an item based on input data associated with the item. Depending on the size of the rule table, such classification and other similar operations may be resource intensive.

BRIEF DESCRIPTION OF THE DRAWINGS

Various embodiments in accordance with the present disclosure will be described with reference to the drawings, in which.

DETAILED DESCRIPTION

Figure 1:
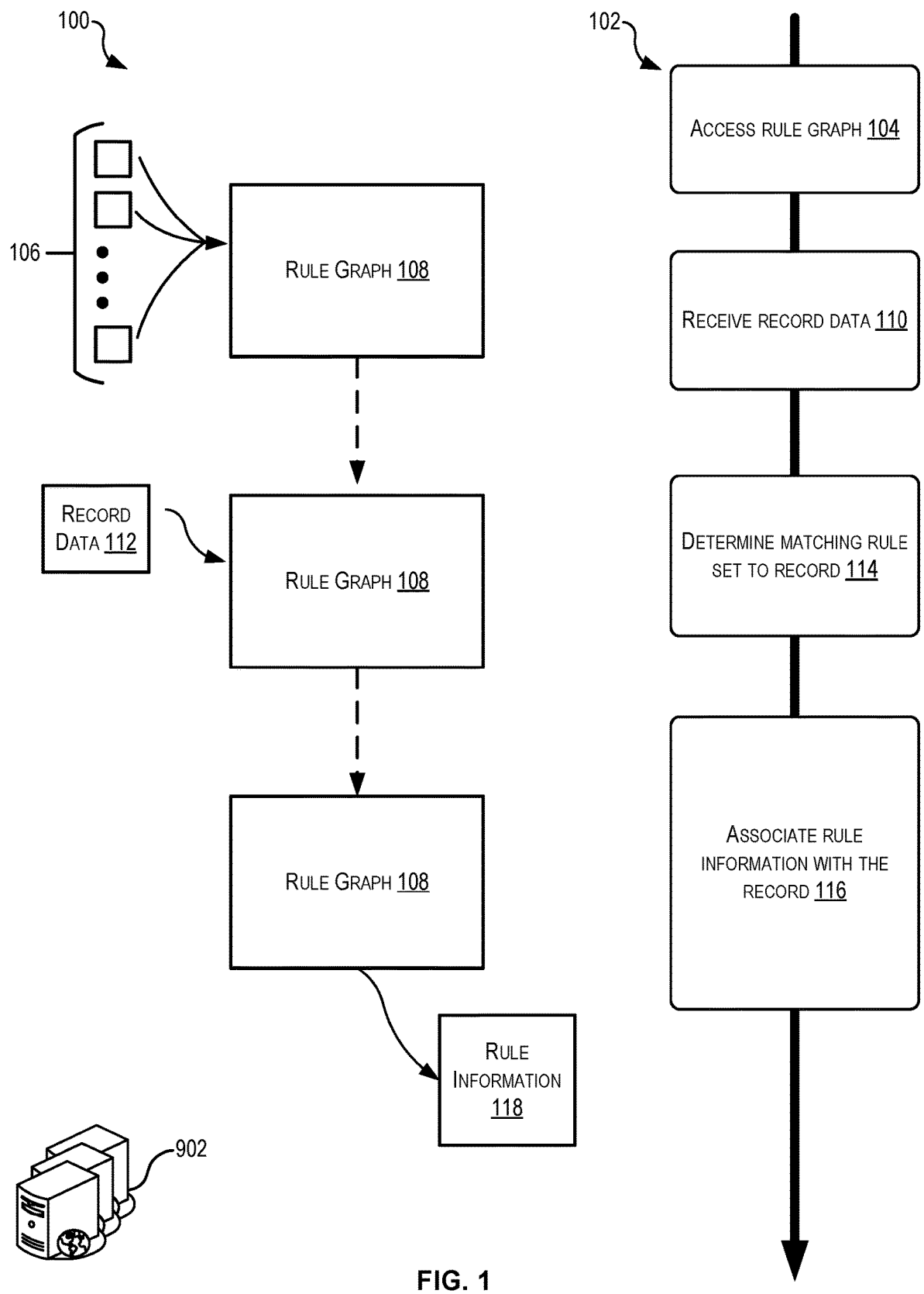
FIG. 1 illustrates an example block diagram and associated flowchart showing a process for implementing techniques relating to associating record data with rule information using a rule graph, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, various techniques for implementing a rule engine. A computing device, which can function as the rule engine, can perform operations relating to generating, modifying, and traversing a rule graph. In an example, the computing device can access a rule graph that represents rule sets and includes nodes connected by edges. The computing device can receive record data associated with a record and determine at least one of the rule sets that matches the record by at least traversing the rule graph using the record data. The computing device can generate rule information based on the at least one rule set and associate the rule information with the record. The computing device may also identify overlapping rule sets (e.g., rule sets that share an ending node) and take action accordingly by either outputting an indication of the overlap to a user device or by automatically pruning nodes of a rule set that is determined to be unattainable.

In a particular example, a computing device, such as a webserver, a personal computing device, a tablet computer, a smartphone, or the like, can access a rule table defining rule sets associated with classifying items in an online marketplace. Each rule set can be a row of the table and can have columns specifying criteria associated with the rule set. The computing device can generate a rule graph that represents the rule sets by generating sets of nodes for each column of a rule set that branch from nodes for a previous column of the rule set. The rule graph can have ending nodes that correspond to classifications for items. The computing device can access the rule graph, and upon receiving item data associated with an item, the computing device can traverse the rule graph using the item data to determine a rule set that matches the item. For instance, edges of the rule graph can be labeled with criterion of the rule sets, so the computing device can compare properties of the item with the criterion until an ending node of the rule graph is reached. The ending node can be associated with one or more matching rule sets, and based on the determined match(es), the computing device can generate rule information. For instance, the rule information for one matching rule set may indicate that a matching item is to be classified as in a bed and bath category. For overlapping rule sets, the rule information for another matching rule set may indicate that a matching item is to be classified in a household appliance category. The computing device then associates the rule information with the item so that the bed and bath classification and the household appliance classification is associated with the item.

Techniques described herein provide several technical advantages over a conventional rule engine. For example, a conventional rule engine may involve analyzing a table that defines the rule sets. Each rule set can be a row of the table with columns defining criteria associated with the rule set. For cases in which there may be hundreds or thousands of rule sets and each rule set is associated with tens or hundreds of columns, the processing requirements for determining a match for a record to a rule set may be significant. As an example, consider a rule engine attempting to match one million records to rules, in which there are one thousand rule sets, each with thirty columns. Since the conventional rule engine processes rule sets sequentially to find a match, on average, for each column and each row, 50% of the rule sets have to be analyzed before finding a match. So, for the one million records, 7.5 billion comparisons have to be performed. But, by generating a rule graph and traversing the rule graph to classify transactions as described herein, the comparisons performed by rule engine of the present disclosure are independent of the number of rule sets in the table. So, for the one million records, in some examples thirty million or fewer comparisons have to be performed, which reduces the computing requirements by fifty times. In addition, the conventional rule engines may not identify overlapping rule sets, and therefore rule information may be applied inaccurately to records. The rule engine of the present disclosure can identify overlaps and perform operations to mitigate the overlaps in cases where overlaps are not advantageous. As an example operation, the rule engine may automatically prune nodes of the rule graph associated with a rule set that overlaps with another rule set and is determined to be unattainable. The automatic pruning reduces the number of nodes of the rule graph that are traversed, which also contributes to a reduction in computing requirements.

Turning now to the figures, FIG. 1 illustrates an example block diagram 100 and associated flowchart showing a process 102 for implementing techniques relating to associating record data with rule information using a rule graph, according to at least one example.

The diagram 100 depicts devices, objects, and the like that correspond to the process 102. The process 102 can be performed by any suitable combination of hardware and/or software, as described herein.

FIGS. 1, 2, 3, and 8 illustrate example flow diagrams showing respective processes 102, 200, 300, and 800, as described herein. The processes 102, 200, 300, and 800, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A rule graph engine 910 (FIG. 9) embodied in a computer system 902 (FIG. 9) and/or within a user device 904 (FIG. 9) may perform the process 102. Thus, while the description below is from the perspective of the computer system 902, the user device 904 may also perform the process 102 or portions of the process 102.

The process 102 may begin at block 104 by the computer system 902 accessing a rule graph 108. The rule graph 108 can include nodes and edges that connect the nodes. The rule graph 108 may additionally or alternatively be realized as a matrix, as a list of edges and nodes, or any other suitable implementation. The rule graph 108 can represent rule sets 106 that define rule information that can be associated with record data. For example, the rule sets 106 may specify rules related to an online marketplace. For instance, the rule sets 106 may relate to transactions in the online marketplace or items in the online marketplace. As a particular example, the rule sets 106 can specify rules for applying taxes to transactions in the online marketplace, where each rule set of the rule sets 106 specifies criteria of a transaction that result in a particular tax being applied.

The process 102 may continue at block 110 by the computer system 902 receiving record data 112. The record data 112 is associated with a record, such as a transaction record associated with a transaction or an item record associated with an item in the online marketplace. For instance, a user may interact with the online marketplace to purchase a shirt, and the record data 112 can be associated with the purchase of the shirt. The record data 112 can include an indication of a location of a seller of the shirt, a location of the user purchasing the shirt, an item identifier associated with the shirt, a cost of the shirt, and any other suitable information associated with the purchase of the shirt.

The process 102 may continue at block 114 by the computer system 902 determining a matching rule set to the record. The computer system 902 can traverse the rule graph 108 using the record data 112 to determine one or more of the rule sets 106 that match the record. Matching a record can involve traversing the rule graph 108 to identify an ending node of the rule graph 108 based on the record data 112. For instance, properties of the record data 112 can be matched with the criteria of the rule sets 106 represented in the rule graph 108 until a single ending node is reached.

The process 102 may continue at block 116 by the computer system 902 associating rule information 118 with the record. The rule information 118 can define properties of the matching rule set. For instance, the rule information 118 can specify the rule that is to be applied to the record based on the record data 112 being matched to the rule set. As an example, for the transaction of the shirt, computer system 902 can determine, by traversing the rule graph 108, that the transaction record matches with a rule set that specifies the rule information 118 of applying a 3% tax to the purchase. So, the transaction record is updated to be associated with the 3% tax. The transaction can then be processed in accordance with the rule information 118 by applying the 3% tax to the transaction. The rule information 118 can also be presented at a user device (e.g., a computing device associated with the seller of the shirt or an operator of the online marketplace). Presenting the rule information 118 may allow the seller or operator to verify that the correct tax is applied to the transaction based on predefined tax regulations.

Figure 2:
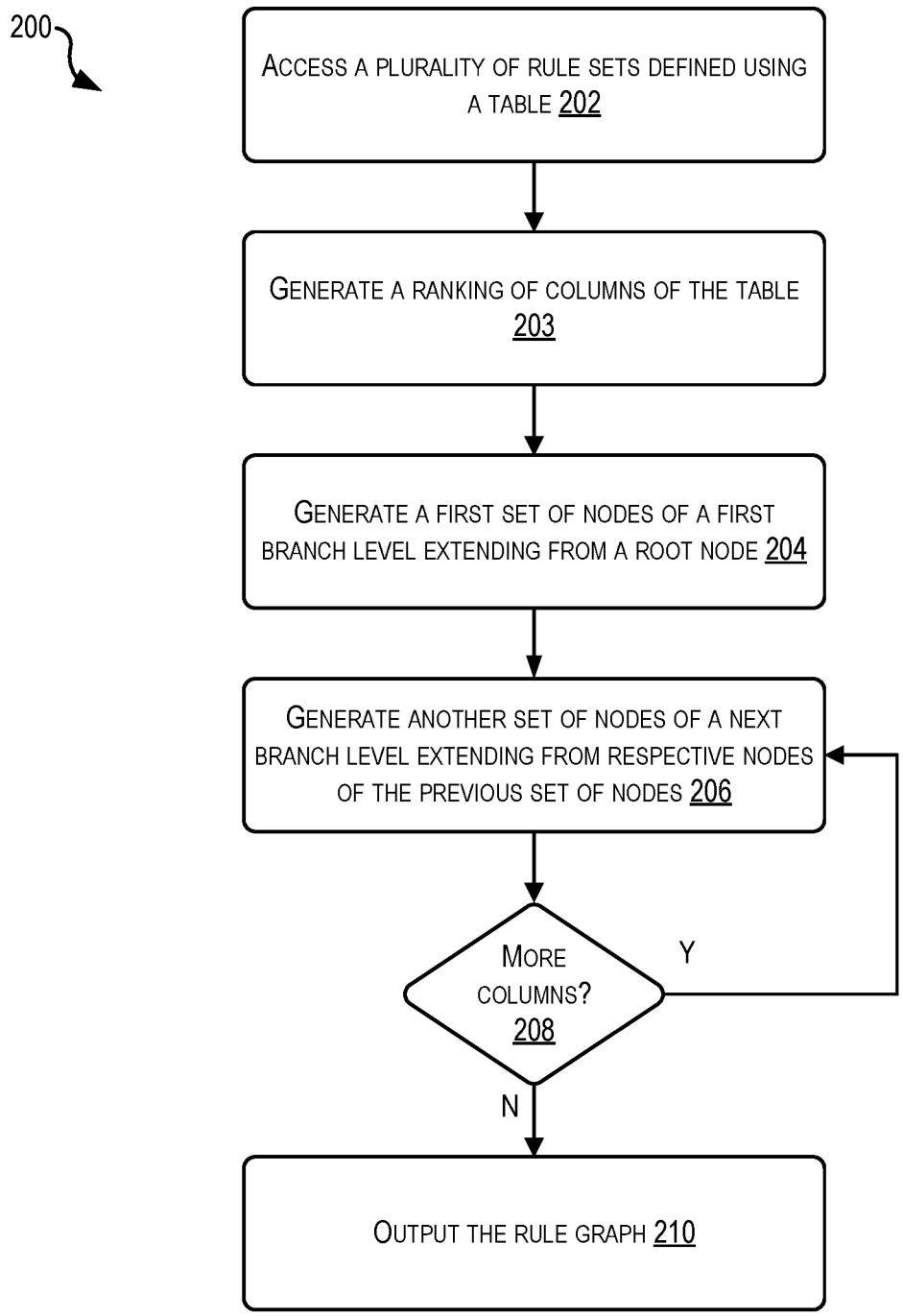
FIG. 2 illustrates an example flowchart showing a process of generating a rule graph, according to at least one example.

FIG. 2 illustrates an example flowchart showing a process 200 of generating a rule graph (e.g., rule graph 108 in FIG. 1), according to at least one example. The rule graph engine 910 (FIG. 9) embodied in the computer system 902 (FIG. 9) and/or within the user device 904 (FIG. 9) may perform the process 200. Thus, while the description below is from the perspective of the computer system 902, the user device 904 may also perform the process 200 or portions of the process 200.

The process 200 may begin at block 202 by the computer system 902 accessing a plurality of rule sets (e.g., rule sets 106 in FIG. 1) defined using a table. Each rule set can be a row of the table and can include at least on criterion in at least one column in the table. One column of the table can define rule information (e.g., rule information 118 in FIG. 1) associated with the respective rule set. For example, the rule information can define a classification (e.g., bed and bath, appliances, entertainment, kitchen, books, etc.) for an item and a column of the rule sets can indicate item identifier(s) that are associated with the classification. Additional columns can also indicate other criteria associated with the classification. Rule information for other rule sets may define how taxes are to be applied, how medical data is to be classified, how banking fees are to be applied, etc. In some examples, one or more rules of the plurality of rule sets may be a regular expression (REGEX) string operator.

The process 200 may continue at block 203 by the computer system 902 generating a ranking of the columns of the table. The columns may be ranked based on an entropy of each column, and the columns can be ordered from least entropy to most entropy. Using the ranking to build a rule graph can provide memory savings by reducing a memory-footprint of the rule graph and can provide time-saving for building the rule graph from the rule-sets. In other examples, the columns may be ranked in other ways as well.

The process 200 may continue at block 204 by the computer system 902 generating a first set of nodes of a first branch level extending from a root node. The first set of nodes can be generated based on a first column of the columns of the table. The first column can be the column ranked highest in the ranking, thus the first column can have the least entropy of the columns. The computer system 902 can generate a finite automata for the first column. The computer system 902 may generate a finite automata for the first column of each rule set, where each finite automata includes a state node and an accepting node connected by an edge. The edges define the criterion associated with the first column. Multiple state nodes may connect to the same accepting node, or each state node may connect to a different accepting node.

The process 200 may continue at block 206 by the computer system 902 generating another set of nodes of a next branch level extending from respective nodes of the previous set of nodes. For instance, after generating the first set of nodes, the computer system 902 can generate a second set of nodes extending from the first set of nodes based on a second column of the table defining the rule sets. The second set of nodes can be at a second branch level. The second column can have the next-lowest entropy in the ranking. The computer system 902 can generate finite automata according to the criterion specified in the second columns of the rule sets.

The process 200 may continue at block 208 by the computer system 902 determining whether there are more columns. The computer system 902 can analyze the table to determine whether a set of nodes has been generated for each column. The computer system 902 may additionally or alternatively analyze the ranking to determine whether a set of nodes has been generated for each column. If there are more columns, the computer system 902 can return to block 206 to continue generating finite automata for the additional columns based on the ranking. In some examples, the table may include a high number of columns (e.g., ten, twenty, thirty, forty, or any other suitable number of columns), so the computer system 902 may repeat blocks 206 and 208 a corresponding number of times. Upon determining that the table does not include more columns, the computer system 902 can proceed to block 210.

The process 200 may continue at block 210 by the computer system 902 outputting the rule graph. The rule graph may be output the rule graph for presentation at a user device. Once generated, the rule graph can be traversed to associate rule information with records so that record data can be processed in accordance with the rule information. A number of hops from a root node of the rule graph to an ending node to identify one or more matching rule sets for the record data can be equal to the number of columns in the table. So, if the table includes twenty columns, the computer system 902 traverses the rule graph by making twenty hops to an ending node.

Figure 3:
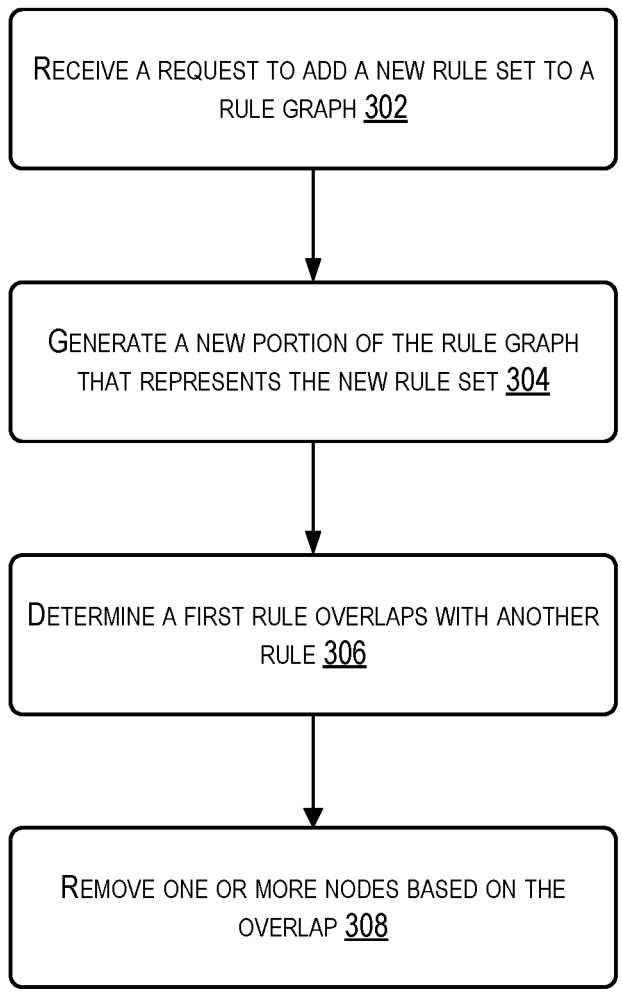
FIG. 3 illustrates an example flowchart showing a process of modifying a rule graph, according to at least one example.

FIG. 3 illustrates an example flowchart showing a process 300 of modifying a rule graph (e.g., rule graph 108 in FIG. 1), according to at least one example. The rule graph engine 910 (FIG. 9) embodied in the computer system 902 (FIG. 9) and/or within the user device 904 (FIG. 9) may perform the process 300. Thus, while the description below is from the perspective of the computer system 902, the user device 904 may also perform the process 300 or portions of the process 200.

The process 300 may begin at block 302 by the computer system 902 receiving a request to add a new rule set to a rule graph. The rule graph may previously have been generated in accordance with the process 200 in FIG. 2. As such, the rule graph can include nodes connected by edges representing rule sets defined in a table. The request can include a new set of criteria that represent the new rule set. The new rule set can be defined as a new row of the table and can include a same or different number of columns than other rule sets of the table. In some examples, a user may provide the new rule set via a user device without adding the new rule set as a new row of the table. Or, rule sets may be stored in a database that the computer system 902 periodically accesses to determine whether a new rule set has been added. Upon determining the new rule set has been added to the database, the computer system 902 can pull the new rule set from the database.

The process 300 may continue at block 304 by the computer system 902 generating a new portion of the rule graph that represents the new rule set based on the new set of criteria. The computer system 902 may identify one or more nodes that are affected by the new rule set and update the one or more nodes that are affected. As such, the computer system 902 need not recompute the rule graph in its entirety to add the new rule set to the rule graph.

The process 300 may continue at block 306 by the computer system 902 determining that a first rule overlaps with another rule. The first rule may correspond to the new rule set and the other rule may correspond to an original rule set of the rule sets. Alternatively, both the first rule and the other rule may correspond to original rule sets. The computer system 902 may traverse the rule graph to determine that a single ending node shares edges with two parent nodes, where the two parent nodes are associated with the first rule and the second rule. Based on determining that the first rule and the second rule both share the single ending node, the computer system 902 determines the overlap between the first rule and the second rule. As an example, the computer system 902 may generate a set of sample transaction data and traverse the rule graph using the set of sample transaction data to identify two paths corresponding to the first rule and the second rule, where the two paths both terminate at the single ending node. The computer system 902 may provide information relating to the overlap for presentation at a user device. For example, the computer system 902 may provide the set of sample transaction data for presentation at the user device to indicate to a user a potential input that can result in the overlap. Additionally or alternatively, the computer system 902 may provide a graphic representation of the overlap or a textual description of the overlap for presentation at the user device. The graphical representation can show the single ending node, the two paths that result in the single ending node, or an entirety of the rule graph with a portion of the rule graph associated with the overlap having a presentation feature (e.g., a highlight, bold lines, a circle around the portion, etc.). The textual description can indicate the rule sets associated with the overlap, rule information associated with the overlap, or any other suitable information about the overlap (e.g., the sample transaction data resulting in the overlap, an indication of a rule of the overlapping rules that is unattainable, etc.).

The process 300 may continue at block 308 by the computer system 902 removing one or more nodes based on the overlap. The computer system 902 may remove the one or more nodes automatically without a user input. For instance, the computer system 902 may determine that the first rule is unattainable by traversing the rule graph and determining that the first rule is never a winner, and then may remove nodes that correspond to the first rule from the rule graph based on the first rule being unattainable. Additionally or alternatively, the computer system 902 may remove the one or more nodes in response to a user input after presenting information at the user device. The information may be the textual description or the graphical representation of the overlap. Based on the information, a user may determine which of the overlapping rules is to be applied in the overlap and provide the user input indicating the rule that is to be applied. The computer system 902 can then remove nodes of the other rule that is not to be applied based on the user input. In some examples, the computer system 902 may receive a request to delete at least one rule. The rule(s) may be an overlapping rule or another rule. The computer system 902 can determine that fulfilling the request will result in a dangling node, which is a node that does not have an edge connected to an ending node for potential record data. Upon determining that deleting fulfilling the request will result in the dangling node, the computer system 902 can provide information about the dangling node for presentation at the user device. The information may be textual or graphical and indicate the rule set(s) affected by the dangling node. To reduce a time cost associated with removing nodes or to soft-delete a rule-set in the sense of temporary deletion, a rule set of an overlap in an ending node can be marked as deleted (e.g., via a user input) without removing nodes from the rule graph. The soft-deletion of the rule set can be undone to enable the activation of the rule set at a later point of time. Soft-deleting rules may be useful for various time specific production scenarios, or during regression testing to replay some history of addition and deletion of rule sets.

Figure 4:
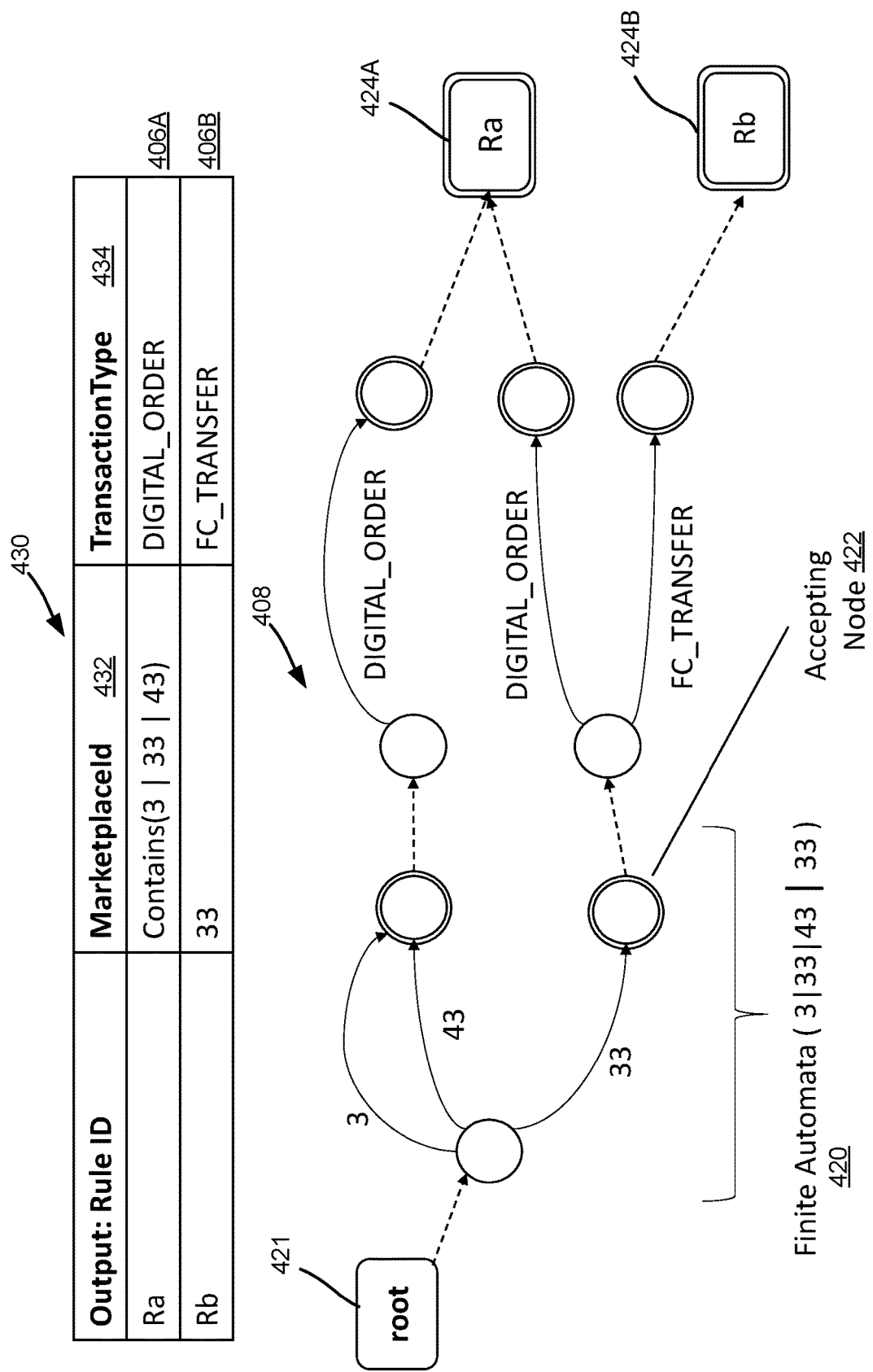
FIG. 4 illustrates an example of a rule graph representing two rule sets, according to at least one example.

FIG. 4 illustrates an example of a rule graph 408 (e.g., rule graph 108 in FIG. 1) representing two rule sets 406A-B, according to at least one example. The rule graph engine 910 (FIG. 9) embodied in the computer system 902 (FIG. 9) and/or within the user device 904 (FIG. 9) may generate and traverse the rule graph 408. Thus, while the description below is from the perspective of the computer system 902, the user device 904 may also perform the operations or a portion of the operation described.

The computer system 902 may receive a table 430 defining the rule sets 406A-B (e.g., rule sets 106 in FIG. 1). As illustrated in FIG. 4, each of the rule sets 406A-B includes a first column 432 and a second column 434, and each of the first column 432 and the second column 434 include a criterion for the respective rule set 406A-B. For example, the first column 432 is associated with a marketplaceID, and the rule set 406A includes the criterion of the marketplaceID containing 3, 33, or 43 and the rule set 406B includes the criterion of the marketplaceID being 33. The second column 434 is associated with a TransactionType, and the rule set 406A includes the criterion of the TransactionType being a DIGITAL_ORDER and the rule set 406B includes the criterion of the TransactionType being an FC_TRANSFER. Therefore, record data that includes a marketplaceID of 3, 33, or 43 and has a TransactionType of DIGITAL_ORDER matches rule set 406A and record data that includes a marketplaceID of 33 and a TransactionType of FC_TRANSFER matches rule set 406B.

The computer system 902 generates the rule graph 408 based on the table 430. For instance, the computer system 902 generates a set of nodes for each column of the table 430. Each column is at a particular branch level of the rule graph 408, and the branch level corresponds to a distance from a root node 421. So, the first column 432 can correspond to a first set of nodes of a first branch level extending from the root node 421 and the second column 434 can correspond to a second set of nodes of a second branch level extending from the first set of nodes. Edges connecting the nodes can be associated with the criterion specified by the columns for the rule sets 406A-B. The nodes connected by edges for a column can be a finite automata 420 that includes an accepting node 422. For instance, the finite automata 420 represents the first column 432 for the rule sets 406A-B. Once a set of nodes is generated for each column of the table 430, the final set of nodes is connected to a corresponding ending node 424 that identifies to which of the rule sets 406A-B the ending node 424 is associated. For example, ending node 424A is illustrated as being associated with rule ID "Ra", which corresponds to rule set 406B, and ending node 424B is illustrated as being associated with rule ID "Rb", which corresponds to rule set 406B.

As an example, the rule graph 408 can be a Java™ class with a hash table. The hash table includes keys and values, where the keys represent the criteria for the rule sets 406A-B and the values represent rule information associated with the rule sets 406A-B. For instance, the edges of the rule graph 408 can be labeled with the keys and the ending nodes can represent the values.

Once the rule graph 408 is generated, the computer system 902 can receive record data associated with a record and traverse the rule graph 408 to determine which of the rule sets 406A-B is to be applied to the record. For example, the computer system 902 may receive record data indicating a marketplaceID of 33 and a TransactionType of DIGITAL_ORDER. So, by traversing the rule graph 408 and ending at the ending node 424A, the computer system 902 can determine that the record matches rule set 406A. Therefore, the computer system 902 can determine rule information associated with the rule set 406A and associated the rule information with the record.

Figure 5:
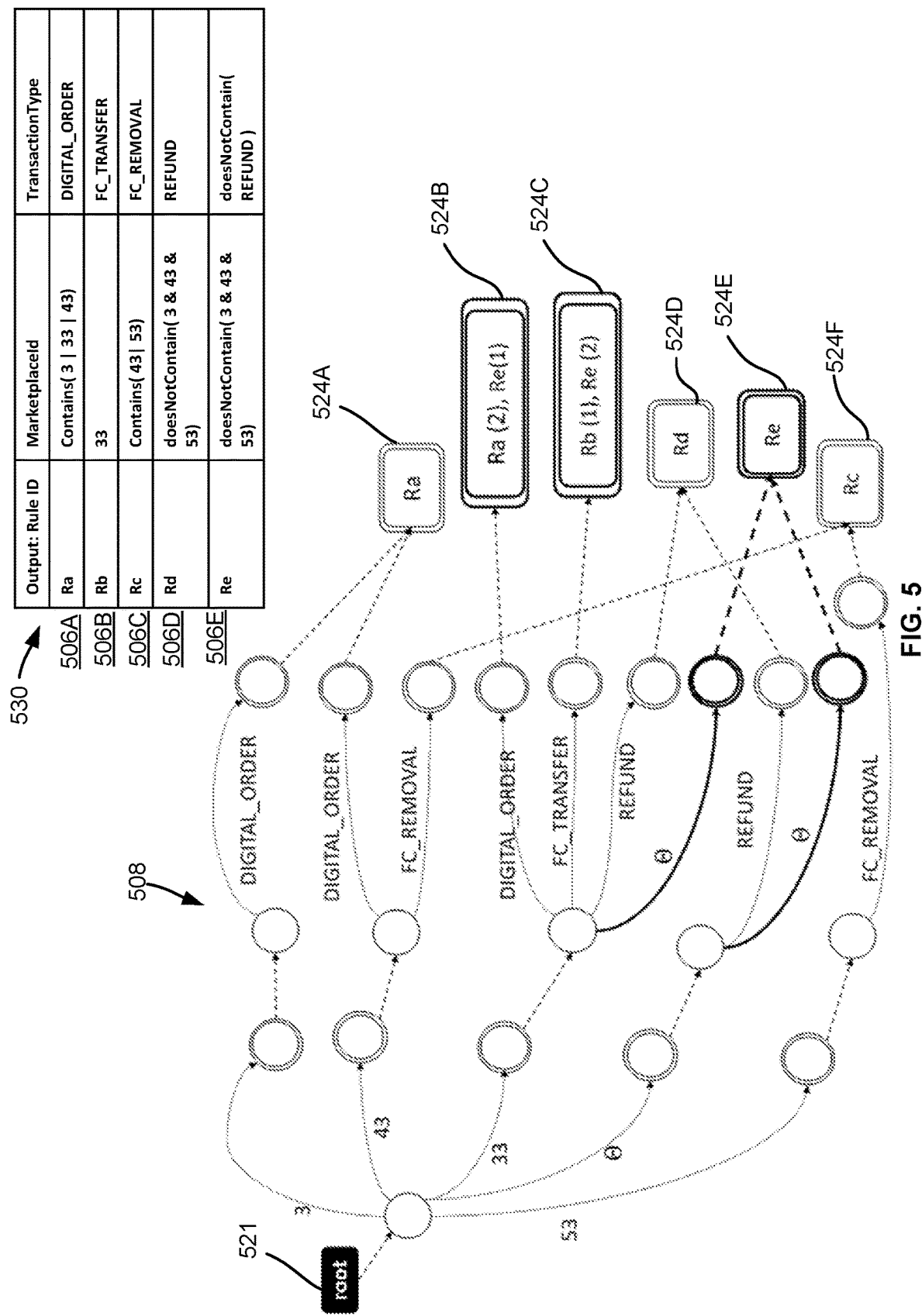
FIG. 5 illustrates an example of a rule graph representing five rule sets with overlaps, according to at least one example.

FIG. 5 illustrates an example of a rule graph 508 (e.g., rule graph 108 in FIG. 1) representing five rule sets with overlaps, according to at least one example. The rule graph engine 910 (FIG. 9) embodied in the computer system 902 (FIG. 9) and/or within the user device 904 (FIG. 9) may generate and traverse the rule graph 508. Thus, while the description below is from the perspective of the computer system 902, the user device 904 may also perform the operations or a portion of the operation described.

The computer system 902 can generate the rule graph 508 for rule sets 506A-E (e.g., rule sets 106 in FIG. 1) defined in a table 530. A Θ at an edge represents a match to any criteria other than the specified criteria of the other edges branching from the same node. For instance, the Θ in the first branch level of the rule graph 508 corresponds to any marketplaceID other than 3, 33, 43, and 53. Upon generating the rule graph 508, the computer system 902 can determine that rule set 506A and rule set 506E overlap at ending node 524B and that rule set 506B and rule set 506E overlap at ending node 524C. One of the overlapping rule sets may be assigned priority. For instance, rule set 506E is illustrated as having priority at ending node 524B and rule set 506B is illustrated as having priority at ending node 524C. The computer system 902 can prune rule sets based on determining the overlap. For instance, if the computer system 902 determines that a rule set is determined to overlap with other rule sets in multiple occasions, and if in all such occasions, the specific rule set is never a winner at least once then the rule set is determined to be unattainable, and the computer system 902 can prune nodes of the rule graph 508 associated with the rule set automatically. Each time a rule set is added to the rule graph 508, the computer system 902 can determine whether any rule set is unattainable and prune the rule graph 508, if needed. Additionally or alternatively, the computer system 902 may output an indication of the overlap to a user device, and a user can provide a user input indicating which rule set is to be the winner. As illustrated in FIG. 5, if, for ending node 524C, rule set 506E (e.g., Re) is made to win over rule set 506B (e.g., Rb), then rule set 506B is unattainable. This is because no other traversals will result in an ending node that represents rule set 506B. But, if rule set 506E is made to lose against both rule set 506A and rule set 506B at ending nodes 524B and 524C, respectively, rule set 506E is still attainable via other paths leading to ending node 524E.

Overlapping rules may be advantageous in some use cases. For instance, if the rule sets 506A-E define classifications for items in an online marketplace, an overlap may identify multiple classifications for an item. As an example, rule set 506A may be associated with rule information for classifying an item as a household appliance and rule set 506E may be associated with rule information for classifying an item as a kitchen item. So, traversing the rule graph 508 for record data associated with an item record that ends at the ending node 524B can indicate that the computer system 902 is to classify the item as both a household appliance and a kitchen item, since the rule set 506A and the rule set 506E overlap at the ending node 524B.

The computer system 902 can also determine dangling nodes that will result from removing a rule set from the rule graph 508. For example, if, in FIG. 5, rule set 506D is deleted, resulting in ending node 524D being deleted, inputs that would have otherwise matched the rule set 506D, would always match to ending node 524E, so there would be no dangling node. But, if both rule sets 506D and 506E are deleted, then some of the nodes will now be dangling nodes. For example, the node associated with (33, REFUND) will be a dangling node, since no ending node can be reached without the rule set 106D. In summary, if removing a rule set can cause a path from some inner node (or root node 521) to the ending node to be removed, and in that case if the inner node (or root node 521) does not have an edge labeled Θ, then there will be dangling node with the deletion of this rule set. So, upon determining resulting dangling nodes, the computer system 902 may provide information about the dangling node for presentation at a user device.

Figure 6:
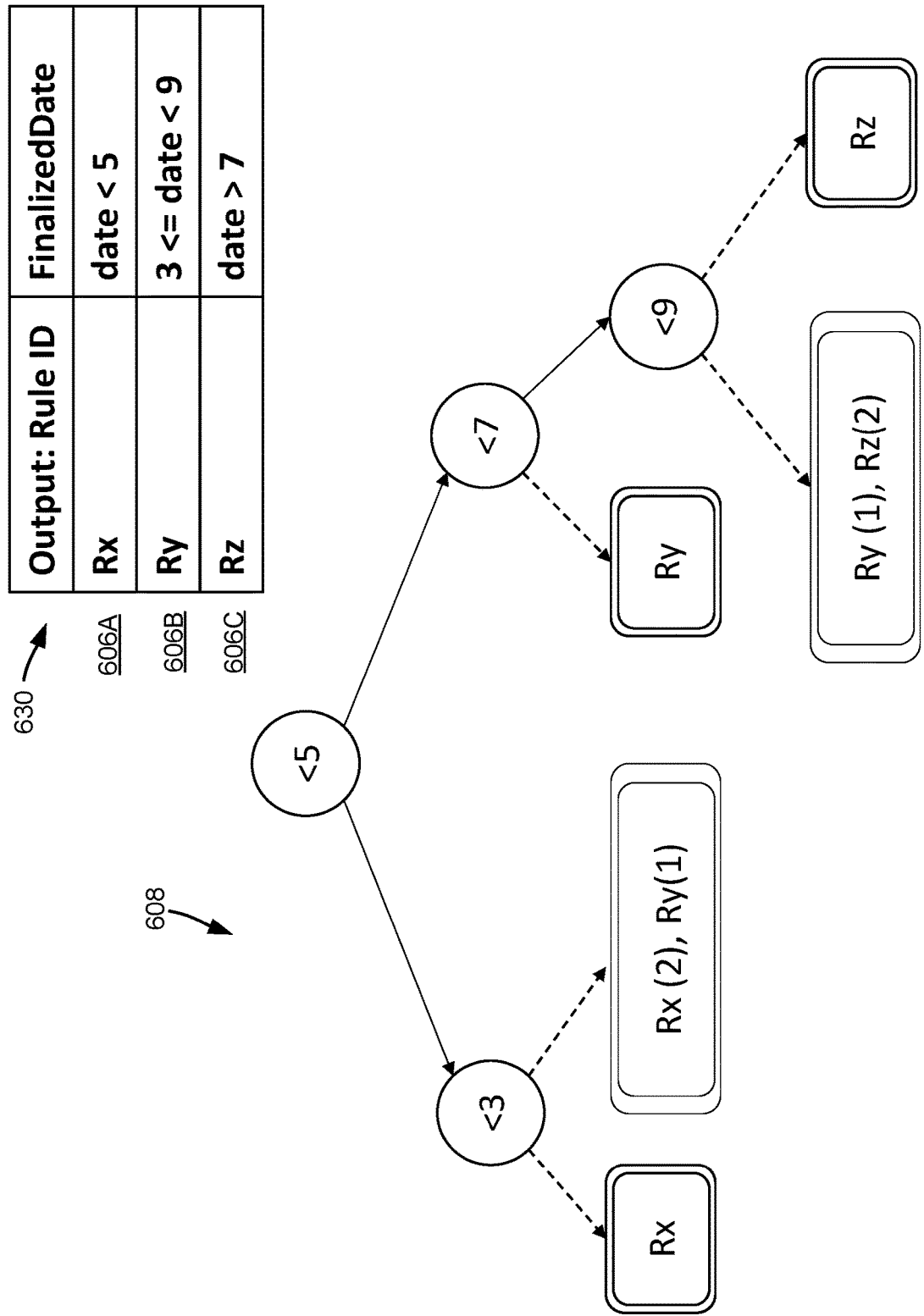
FIG. 6 illustrates an example of a rule graph representing rule sets with numerical operators, according to at least one example.

FIG. 6 illustrates an example of a rule graph 608 (e.g., rule graph 108 in FIG. 1) representing rule sets with numerical operators, according to at least one example. The rule graph engine 910 (FIG. 9) embodied in the computer system 902 (FIG. 9) and/or within the user device 904 (FIG. 9) may generate and traverse the rule graph 608. Thus, while the description below is from the perspective of the computer system 902, the user device 904 may also perform the operations or a portion of the operation described.

The computer system 902 can generate the rule graph 608 as a binary tree, as illustrated in FIG. 6. The computer system 902 may receive a record of a number and traverse the rule graph 608 to determine rule information that is to be associated with the number. Each input number of the record involves $O([\log_2 R]+1)$ comparisons, where R is the number of operators used in all rules for that column in the table 630. So, for the FinalizedDate column in the table 630, rule set 606A includes one operator, rule set 606B includes two operators, and rule set 606C includes one operator, so R is four.

In some examples, rather than using a binary tree, numbers may be treated as string literals and the criterion can be treated as REGEX string operators when generating the rule graph 608. In such examples, each input number involves $O(d)$ comparisons, where d is the number of digits in the number. So, for a rule graph representing 500 rules having an R of 300 operators, a binary tree would involve an average of $[\log_2 300]+1=9$ comparisons, whereas, using REGEX string operators would involve 3 comparisons for records of mostly 3-digit numbers. But, generating finite automata for REGEX string operators may be relatively complex compared to generating the binary tree.

Figure 7:
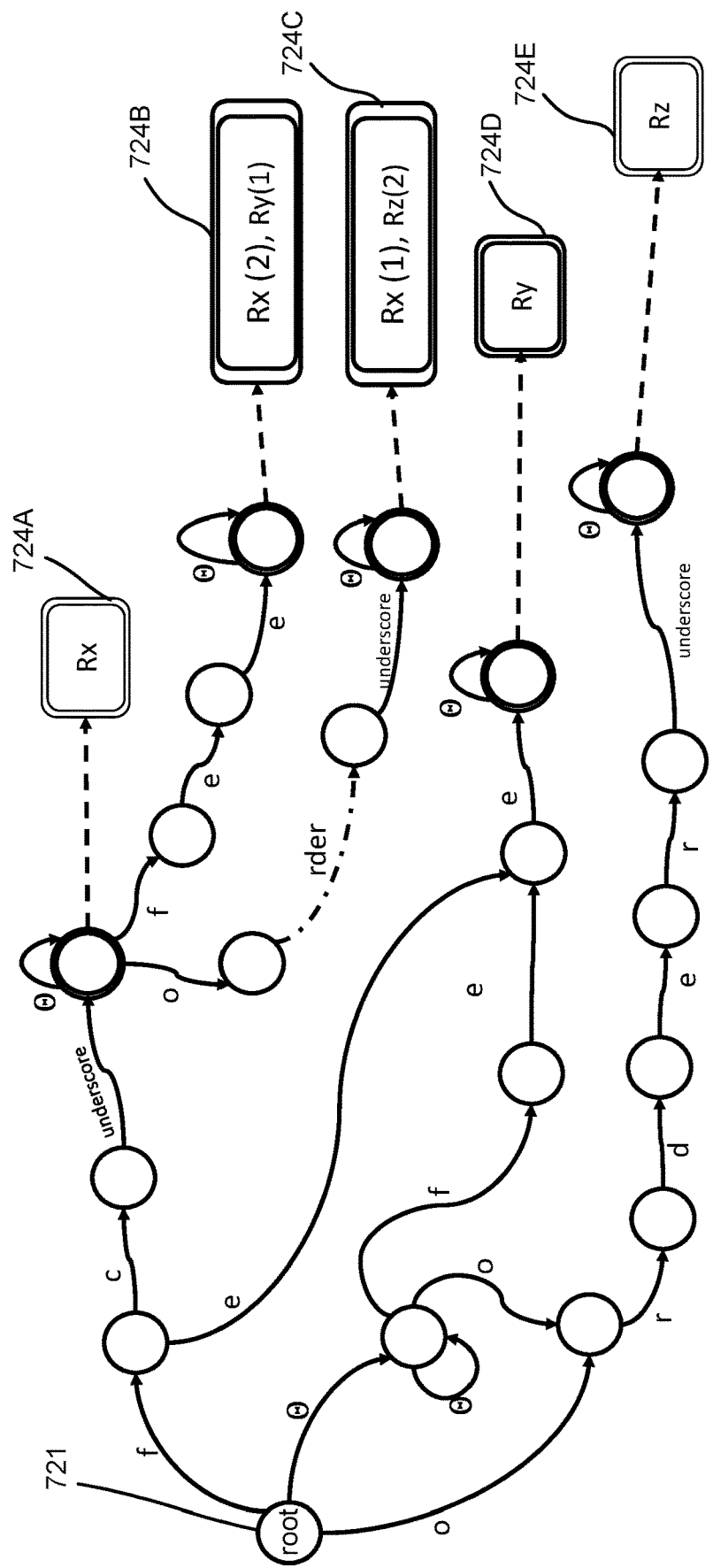
FIG. 7 illustrates an example of a rule graph representing rule sets of regular expression string operators, according to at least one example.

FIG. 7 illustrates an example of a rule graph 708 (e.g., rule graph 108 in FIG. 1) representing rule sets of REGEX string operators, according to at least one example. The rule graph engine 910 (FIG. 9) embodied in the computer system 902 (FIG. 9) and/or within the user device 904 (FIG. 9) may generate and traverse the rule graph 708. Thus, while the description below is from the perspective of the computer system 902, the user device 904 may also perform the operations or a portion of the operation described.

Rule sets 706A-C (e.g., rule sets 106 in FIG. 1) defined in a table 730 can include REGEX string operators that can be used to generate the rule graph 708. Examples of REGEX string operators that are shown in FIG. 7 include "beginsWith" and "constainsSubstring", but other REGEX string operators are possible. The computer system 902 generates finite automata on a character-by-character basis. So, rather than a finite automata being generated for each criterion, a finite automata is generated for each character of a criterion. Accordingly, the rule graph 708 may have increased granularity or density compared to a rule graph with a finite automata for each criterion as a whole. In addition, the computer system 902 traverses the rule graph 708 on a character-by-character basis to determine which of the rule sets 706A-C is associated with an ending node 724 of the traversing. Using REGEX operators, the number of hops from a root node 721 to the ending node 724 can still be equal to the number of columns in the table 730, even though a finite automata is generated for each character, since the traversing involved for the characters of one column of a rule set 706 are considered to collectively be one hop.

In an example, the computer system 902 may receive record data of "fc_fee". Beginning at root node 721, the computer system 902 traverses the edge labeled "f", then the edge labeled "c", then the edge labeled "underscore", then the edge labeled "f", then the edge labeled "e", then the edge labeled "e", ending at the ending node 724B. Ending node 724B is illustrated as having an overlap for rule set 706A and rule set 706B, but rule set 706B having priority. The priority may be based on a user input. So, the computer system 902 determines rule information associated with the rule set 706B and processes the record according to the rule information.

As another example, the computer system 902 may receive record data of "fc_x". Beginning at the root node 721, the computer system 902 traverses the edge labeled "f", then the edge labeled "c", then the edge labeled "underscore", then the edge labeled "Θ", ending at the ending node 724A, which is associated with rule set 706A. So, the computer system 902 determines rule information associated with the rule set 706A and processes the corresponding record according to the rule information.

In some examples, REGEX operators are possible in conjunction with criterion rule graphs (e.g., rule graphs 408, 508). For example, the first layer (e.g., finite automata 420 in FIG. 4) may remain as shown, but the second layer may be replaced with a set of REGEX nodes similar to rule graph 708.

Figure 8:
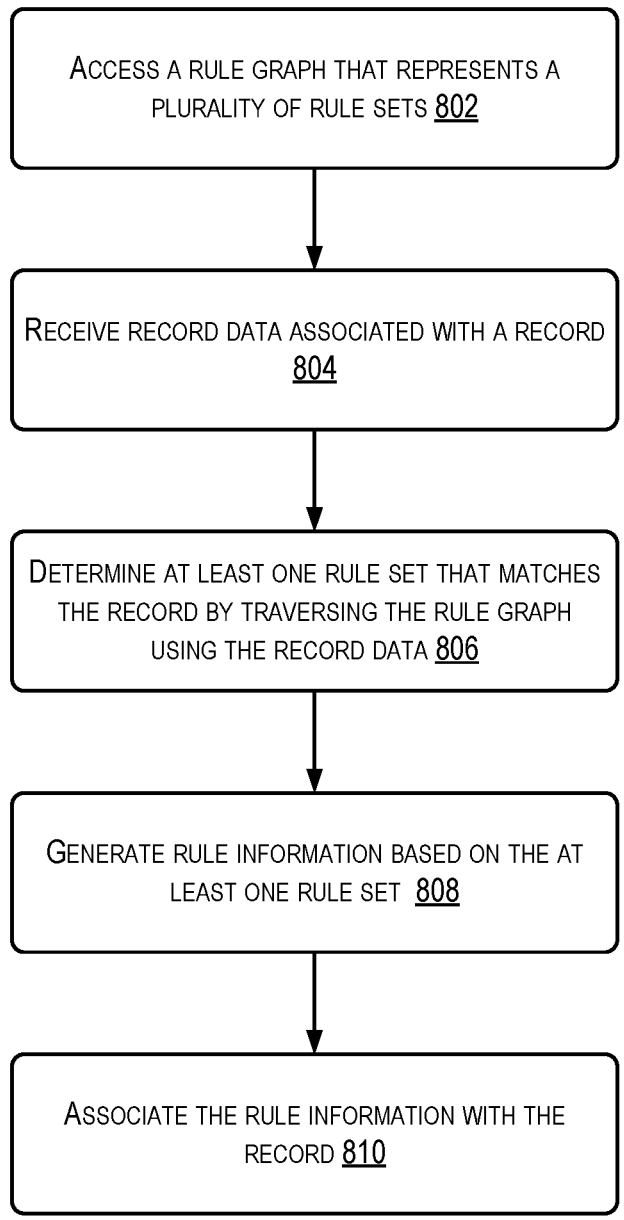
FIG. 8 illustrates an example flowchart showing a process for implementing techniques relating to generating and using a rule graph, according to at least one example.

FIG. 8 illustrates an example flowchart showing a process 800 for implementing techniques relating to generating and using a rule graph, according to at least one example. The rule graph engine 910 (FIG. 9) embodied in the computer system 902 (FIG. 9) and/or within the user device 904 (FIG. 9) may perform the process 800. Thus, while the description below is from the perspective of the computer system 902, the user device 904 may also perform the process 800 or portions of the process 800.

The process 800 may begin at block 802 by the computer system 902 accessing a rule graph 108 (FIG. 1) that represent a plurality of rule sets 106 (FIG. 1). The computer system 902 may access the plurality of rule sets 106 defined using a table, and each rule set of the plurality of rule sets 106 can include at least one criterion in at least one column of a plurality of columns in the table. At least one rule set of the plurality of rule sets 106 can include a regular expression string operator. The computer system 902 can generate the rule graph 108 based on the plurality of rule sets 106. The rule graph 108 can include a plurality of nodes connected by a plurality of edges. The computer system 902 may generate the rule graph 108 by generating a first set of nodes of a first branch level extending from a root node based at least in part on a first column of the plurality of columns, and by generating a second set of nodes of a second branch level extending from respective nodes of the first set of nodes based at least in a second column of the plurality of columns. Generating the rule graph 108 can also involve generating a ranking of the plurality of columns, where the first set of nodes is associated with a highest ranking in the ranking. Generating the first set of nodes of the first branch level can involve generating a first finite automata for the first column. The process 800 may continue at block 804 by the computer system 902 receiving record data 112 (FIG. 1) associated with a record. The record can be a transaction record associated with a transaction in an online marketplace. The record may alternatively be an item record associated with an item in an online marketplace, a banking record associated with accounts with a bank, an insurance record, a medical record, etc.

The process 800 may continue at block 806 by the computer system 902 determining at least one rule set that matches the record by at least traversing the rule graph 108 using the record data. For transaction data, the computer system 902 can determine at least one rule set of the plurality of rule sets 106 that matches the transaction by at least traversing the rule graph 108 using the transaction data. The computer system 902 may determine an overlap between a first rule set of the plurality of rule sets 106 and a second rule set of the plurality of rule sets 106 by at least traversing the rule graph 108 and identifying that a single ending node is associated with the first rule set and the second rule set. The computer system 902 can generate a set of sample transaction data, traverse the rule graph 108 using the set of sample transaction data to identify two paths corresponding to the first rule set and the second rule set. Each path of the two paths can terminate at the single ending node. The computer system 902 can provide the set of sample transaction data for presentation at a user device. In addition, the computer system 902 may determine that the first rule set is unattainable by traversing the rule graph 108 to determine that the first rule set is never a winner. The computer system 902 can remove one or more nodes corresponding to the first rule set from the rule graph 108 based at least in part on the first rule set being unattainable. Removing the one or more nodes can involve at least one of removing the one or more nodes automatically and without a first user input, or removing the one or more nodes responsive to a second user input received after presenting information about the first rule at a user device.

The computer system 902 can receive a request to add a new rule set to the rule graph 108. The request can include a new set of criteria that represent the new rule set. The computer system 902 can generate a new portion of the rule graph 108 that represents the new rule set based at least in part on the new set of criteria. The computer system 902 may identify one or more nodes of the plurality of nodes affected by the new rule set, and generate, without recomputing the rule graph 108, the new portion of the rule graph 108 by updating the one or more nodes affected by the new rule set. The computer system 902 may determine that adding the new rule set would create an overlap between the new rule set and at least one rule set of the plurality of rule sets 106 based at least in part on traversing the rule graph 108. The computer system 902 can provide information relating to the overlap for presentation at a user device. The information can include at least one of a graphical representation of the overlap or a textual description of the overlap. In some examples, the computer system 902 may receive a request to delete at least one rule set of the plurality of rule sets 106. The computer system 902 can determine that fulfilling the request will result in at least one dangling node of the plurality of nodes. The computer system 902 can provide information about the at least one dangling node for presentation at a user device.

The process 800 may continue at block 808 by the computer system 902 generating rule information 118 (FIG. 1) based on the at least one rule set. The rule information 118 identifies properties of the at least one rule set.

The process 800 may continue at block 810 by the computer system 902 associating the rule information with the record. If the record data 112 is associated with a transaction, the computer system 902 can process the transaction in accordance with the rule information 118. If the record data 112 is associated with an item record, the computer system 902 can use the rule information 118 to classify the item.

Figure 9:
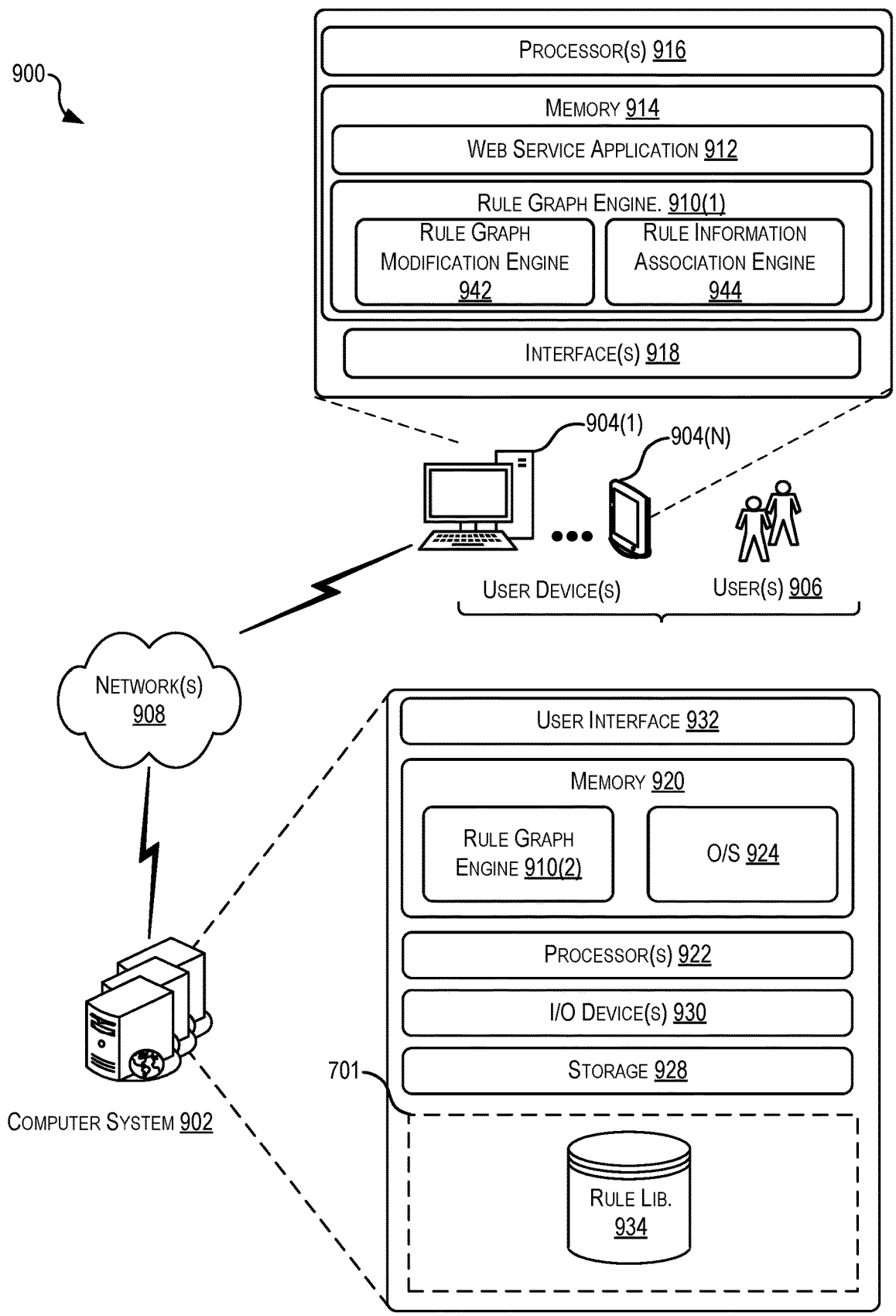
FIG. 9 illustrates an example schematic architecture for implementing techniques relating to generating and using a rule graph, according to at least one example.

FIG. 9 illustrates an example schematic architecture 900 for implementing techniques relating to generating and using a rule graph (e.g., rule graph 108 in FIG. 1), according to at least one example. The architecture 900 may include a computer system 902 (e.g., the computer system described herein) in communication with one or more user devices 904(1)-904(N) via one or more networks 908 (hereinafter, "the network 908").

The user device 904 may be operable by one or more users 906 to interact with the computer system 902. The users 906 may be administrators, developers, or others that desire to test or utilize operations of the techniques described herein. The user device 904 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 904(1) is illustrated as a desktop computer, while the user device 904(N) is illustrated as an example of a handheld mobile device.

The user device 904 may include a memory 914 and processor(s) 916. In the memory 914 may be stored program instructions that are loadable and executable on the processor(s) 916, as well as data generated during the execution of these programs. Depending on the configuration and type of user device 904, the memory 914 may be volatile (such as random access memory ("RAM")) and/or non-volatile (such as read-only memory (ROM), flash memory, etc.).

In some examples, the memory 914 may include a web service application 912 and a version of a rule graph engine 910 (e.g., 910(1)). The web service application 912 and/or the rule graph engine 910(1) may allow the user 906 to interact with the computer system 902 via the network 908. The user device 904 may also include one or more interfaces 918 to enable communication with other devices, systems, and the like. The rule graph engine 910, whether embodied in the user device 904 or the computer system 902, may be configured to perform the techniques described herein.

The rule graph engine 910 includes a rule graph modification engine 942 and a rule information association engine 944. In an example, the rule graph engine 910 can include any other suitable engines, modules, models, and the like.

The rule graph modification engine 942 can manage various tasks related to the generation and modification of a rule graph. In an example, the rule graph modification engine 942 may ingest data, may generate the rule graph, may transmit or otherwise share output from generating the rule graph, and any other suitable tasks. In an example, the rule graph modification engine 942 may take rule sets as input, and may output the rule graph. The rule graph modification engine 942 may be configured to generate rule graphs, modify rule graphs based on requests to add or remove nodes of the rule graphs, and/or perform other suitable tasks with respect to the rule graphs described herein.

The rule information association engine 944 can include one or more computer services for associating rule information with records. In an example, the rule information association engine 944 may be configured to traverse the rule graph according to record data to determine a rule set associated with the record data. Upon determining the rule set, the rule information association engine 944 may generate the rule information based on the rule set and associate the rule information with the record so that the record can be processed in accordance with the rule information.

Turning now to the details of the computer system 902, the computer system 902 may include one or more computer system computers, perhaps arranged in a cluster of servers or as a server farm, and may host web service applications. The function of the computer system 902 may be implemented a cloud-based environment such that individual components of the computer system 902 are virtual resources in a distributed environment.

The computer system 902 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the computer system 902. The memory 920 may store program instructions that are loadable and executable on the processor(s) 922, as well as data generated during the execution of these programs. Depending on the configuration and type of memory including the computer system 902, the memory 920 may be volatile (such as RAM and/or non-volatile (such as read-only memory ("ROM"), flash memory, or other memory)). The memory 920 may include an operating system 924 and one or more application programs, modules, or services for implementing the features disclosed herein including at least a version of the rule graph engine 910 (e.g., 910(2)). For example, the rule graph engine 910(2) may perform the functionality described herein.

The computer system 902 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 902 and/or part of the user device 904.

The computer system 902 may also include input/output (I/O) device(s) and/or ports 830, such as for enabling connection with a keyboard, a mouse, a pen, a voice input device, a touch input device, a display, speakers, a printer, or other I/O device.

In some examples, the computer system 902 may also include one or more user interface(s) 932. The user interface 932 may be utilized by an operator, curator, or other authorized user to access portions of the computer system 902. In some examples, the user interface 932 may include a graphical user interface, voice interfaces, web-based applications, programmatic interfaces such as APIs, or other user interface configurations.

The computer system 902 may also include a data store 901. In some examples, the data store 901 may include one or more databases, data structures, or the like for storing and/or retaining information associated with the computer system 902 and which, in some examples, may be accessible by the user devices 904. The rule graph engine 910 is communicatively coupled (e.g., via a wired connection or a wireless connection) to the data store 901. The data store 901 includes a rule library 934. In an example, the data store 901 can include any other suitable data, databases, libraries, and the like.

Figure 10:
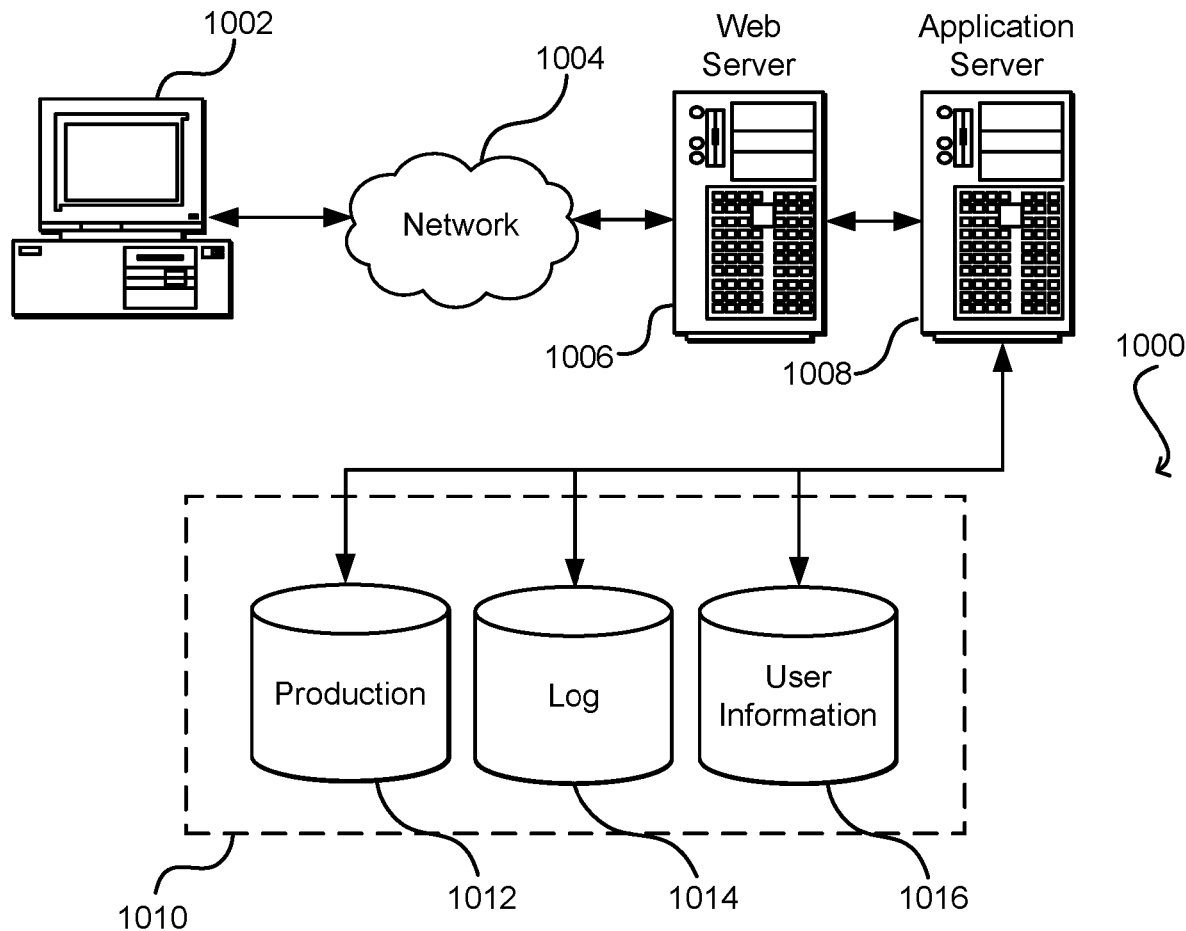
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers.

The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
accessing a plurality of rule sets defined using a table, each rule set of the plurality of rule sets comprising at least one criterion in at least one column of a plurality of columns in the table;
generating a rule graph that represents the plurality of rule sets and comprises a plurality of nodes connected by a plurality of edges, wherein generating the rule graph comprises:
generating a ranking of the plurality of columns;
generating a first set of nodes of a first branch level extending from a root node based at least in part on a first column of the plurality of columns and the ranking, wherein the first set of nodes is associated with a highest ranking in the ranking; and
generating a second set of nodes of a second branch level extending from respective nodes of the first set of nodes based at least in a second column of the plurality of columns and the ranking;
determining an overlap between a first rule set of the plurality of rule sets and a second rule set of the plurality of rule sets by at least traversing the rule graph and identifying that a single ending node is associated with the first rule set and the second rule set;
generating a set of sample transaction data;
traversing the rule graph using the set of sample transaction data to identify two paths corresponding to the first rule set and the second rule set, wherein each path of the two paths terminates at the single ending node;
providing the set of sample transaction data for presentation at a user device;
receiving record data associated with a record;
determining at least one rule set of the first rule set and the second rule set that matches the record by at least traversing the rule graph using the determining, from traversing the rule graph, the single ending node that corresponds to the at least one rule set that matches the record;
generating rule information based on the at least one rule set; and
associating the rule information with the record.

2. The computer-implemented method of claim 1, further comprising:
receiving a request to add a new rule set to the rule graph, the request comprising a new set of criteria that represent the new rule set; and
generating a new portion of the rule graph that represents the new rule set based at least in part on the new set of criteria.

3. The computer-implemented method of claim 2, further comprising
identifying one or more nodes of the plurality of nodes affected by the new rule set, and wherein generating the new portion of the rule graph comprises updating the one or more nodes affected by the new rule set.

4. The computer-implemented method of claim 1, wherein the record comprises a transaction record associated with a transaction in an online marketplace, further comprising processing the transaction in accordance with the rule information.

5. The computer-implemented method of claim 1, wherein the record comprises an item record associated with an item in an online marketplace, further comprising using the rule information to classify the item.

6. The computer-implemented method of claim 1, wherein the ranking is based on entropies of the plurality of columns.

7. A computer-implemented method, comprising:
generating a rule graph that represents a plurality of rule sets defined using a table, each rule set of the plurality of rule sets comprising at least one criterion in at least one column of a plurality of columns in the table, wherein the rule graph comprises a plurality of nodes connected by a plurality of edges, wherein generating the rule graph comprises:
generating a ranking of the plurality of columns based on entropies of the plurality of columns;
generating a first set of nodes of a first branch level extending from a root node based at least in part on a first column of the plurality of columns and the ranking, wherein the first set of nodes is associated with a highest ranking in the ranking; and
generating a second set of nodes of a second branch level extending from respective nodes of the first set of nodes based at least in a second column of the plurality of columns and the ranking;
determining an overlap between a first rule set of the plurality of rule sets and a second rule set of the plurality of rule sets by at least traversing the rule graph and identifying that a single ending node is associated with the first rule set and the second rule set;
receiving record data associated with a record;
determining at least one rule set of the first rule set and the second rule set that matches the record by at least traversing the rule graph using the determining, from traversing the rule graph, the single ending node that corresponds to the at least one rule set that matches the record;
generating rule information based on the at least one rule set; and
associating the rule information with the record.

8. The computer-implemented method of claim 7, further comprising:
accessing the plurality of rule sets; and
generating the rule graph based at least in part on the plurality of rule sets.

9. The computer-implemented method of claim 7, wherein
generating the first set of nodes of the first branch level comprises generating a first finite automata for the first column.

10. The computer-implemented method of claim 7, further comprising:
determining that the first rule set of the plurality of rule sets overlaps with at least one other rule set of the plurality of rule sets;
determining that the first rule set is unattainable by at least traversing the rule graph to determine that the first rule set is never a winner; and
removing one or more nodes corresponding to the first rule set from the rule graph based at least in part on the first rule set being unattainable.

11. The computer-implemented method of claim 10, wherein removing the one or more nodes comprises at least one of removing the one or more nodes automatically and without a first user input, or removing the one or more nodes responsive to a second user input received after presenting information about the first rule set at a user device.

12. The computer-implemented method of claim 7, wherein at least one rule set of the plurality of rule sets comprises a regular expression string operator.

13. The computer-implemented method of claim 7, further comprising:
receiving a request to add a new rule set to the rule graph, the request comprising a new set of criteria that represent the new rule set; and
determining adding the new rule set would create an additional overlap between the new rule set and at least one rule set of the plurality of rule sets based at least in part on traversing the rule graph.

14. The computer-implemented method of claim 13, further comprising providing information relating to the overlap for presentation at a user device, the information comprising at least one of a graphical representation of the overlap or a textual description of the overlap.

15. The computer-implemented method of claim 13, further comprising generating, without recomputing the rule graph, a new portion of the rule graph based at least in part on the new set of criteria, the new portion representing the new rule set.

16. The computer-implemented method of claim 8, further comprising:
generating a set of sample transaction data;
traversing the rule graph using the set of sample transaction data to identify two paths corresponding to the first rule set and the second rule set, wherein each path of the two paths terminates at the single ending node; and
providing the set of sample transaction data for presentation at a user device.

17. A computer system comprising:
a memory configured to store computer-executable instructions; and
a processor configured to access the memory and execute the computer-executable instructions to at least:
generate a rule graph that represents a plurality of rule sets defined using a table, each rule set of the plurality of rule sets comprising at least one criterion in at least one column of a plurality of columns in the table, wherein the rule graph comprises a plurality of nodes connected by a plurality of edges, wherein generating the rule graph comprises:
generating a ranking of the plurality of columns;
generating a first set of nodes of a first branch level extending from a root node based at least in part on a first column of the plurality of columns and the ranking, wherein the first set of nodes is associated with a highest ranking in the ranking; and
generating a second set of nodes of a second branch level extending from respective nodes of the first set of nodes based at least in a second column of the plurality of columns and the ranking;
determine an overlap between a first rule set of the plurality of rule sets and a second rule set of the plurality of rule sets by at least traversing the rule graph and identifying that a single ending node is associated with the first rule set and the second rule set;
generate a set of sample transaction data;
traverse the rule graph using the set of sample transaction data to identify two paths corresponding to the first rule set and the second rule set, wherein each path of the two paths terminates at the single ending node;
provide the set of sample transaction data for presentation at a user device;
receive transaction data associated with a transaction;
determine at least one rule set of the first rule set and the second rule set that matches the transaction by at least traversing the rule graph using the transaction data, wherein traversing the rule graph using the set of sample transaction data comprises determining, from traversing the rule graph, the single ending node that corresponds to the at least one rule set that matches the record transaction;
determine rule information based on the at least one rule set; and
associate the rule information with the transaction.

18. The computer system of claim 17, wherein the rule information identifies properties of the at least one rule set.

19. The computer system of claim 17, wherein the processor is configured to execute additional computer-executable instructions stored in the memory to at least:
receive a request to delete at least one rule set of the plurality of rule sets;
determine that fulfilling the request will result in at least one dangling node of the plurality of nodes; and
provide information about the at least one dangling node for presentation at the user device.

20. The computer system of claim 17, wherein the ranking is based on entropies of the pluralities of columns.

* * * * *